United States Patent
Al-Kadi et al.

(10) Patent No.: US 8,542,118 B2
(45) Date of Patent: Sep. 24, 2013

(54) PRESENCE DETECTION SYSTEM AND METHOD

(75) Inventors: Ghiath Al-Kadi, Eindhoven (NL); Aly Aamer Syed, Deurne (NL); Ewout Brandsma, Eindhoven (NL)

(73) Assignee: NXP B.V., Eindhoven (NL)

(*) Notice: Subject to any disclaimer, the term of this patent is extended or adjusted under 35 U.S.C. 154(b) by 208 days.

(21) Appl. No.: 13/116,824

(22) Filed: May 26, 2011

(65) Prior Publication Data

US 2011/0291832 A1  Dec. 1, 2011

(30) Foreign Application Priority Data

May 27, 2010 (EP) .................................. 10164087

(51) Int. Cl.
*G08B 13/00* (2006.01)

(52) U.S. Cl.
USPC .......................................... 340/541; 340/552

(58) Field of Classification Search
USPC ................. 340/541, 552, 556; 377/6
See application file for complete search history.

(56) References Cited

U.S. PATENT DOCUMENTS

| | | | |
|---|---|---|---|
| 4,009,389 A | 2/1977 | Lindholm | |
| 4,356,387 A | 10/1982 | Tsubota et al. | |
| 5,138,638 A | 8/1992 | Frey | |
| 5,255,301 A | 10/1993 | Nakamura et al. | |
| 6,137,407 A | 10/2000 | Akagawa et al. | |
| 6,255,946 B1 | 7/2001 | Kim | |
| 7,019,641 B1 * | 3/2006 | Lakshmanan et al. | 340/538 |

FOREIGN PATENT DOCUMENTS

| | | |
|---|---|---|
| DE | 3509096 A1 | 9/1986 |
| EP | 2 169 646 A1 | 3/2010 |
| JP | 2003-219399 A | 7/2003 |
| JP | 2006-323709 A | 11/2006 |
| WO | 00/13153 | 3/2000 |
| WO | 01/67414 A1 | 9/2001 |

OTHER PUBLICATIONS

Extended European Search Report for European Patent Application No. 10164087.8 (Aug. 5, 2010).

Pompano, Angelo J., "Privacy in the Age of Video Surveillance This Is Not Your Father's Candid Camera", http://www.yale.ed/ynhti/curriculum/units/2000/3/00.03.05.x.html.

Nixon, et al., "Human Identification Based on Gait", International Series on Biometrics, Springer; 1 edition (Nov. 29, 2005).

Kale, et al., "Gait Analysis for Human Identification" Lecture Notes in Computer Science, vol. 2688, p. 1058, 2003 http://link.springer.com/chapter/10.1007%2F3-540-44887-X_82.

* cited by examiner

*Primary Examiner* — Shirley Lu

(57) ABSTRACT

A presence detection system for detecting objects which move through an entrance of a space. The system is based on the idea to create a signature of a moving object which can be used to determine whether the object is a human being.

8 Claims, 2 Drawing Sheets

PRESENCE DETECTION SYSTEM AND METHOD

This application claims the priority under 35 U.S.C. §119 of European patent application no. 10164087.8, filed on May 27, 2010, the contents of which are incorporated by reference herein.

BACKGROUND OF THE INVENTION

Smart spaces, such as smart homes and smart offices, have steadily gained importance in recent years. Presence detection is a new application domain which is strongly related to smart spaces. The idea of detecting the presence of moving objects by letting them cross a light beam is already known. Other presence detection systems and methods, for example based on pressure transducers, are also known.

For example, U.S. Pat. No. 7,019,641 B1 discloses a human being presence detection system which automatically determines the presence of human beings without directly attaching sensors to the human body and which detects human drowsiness. The detection system characterizes the occupancy of a vehicle seat to determine the characteristics of deployment of vehicle airbags and restraints in the event of a crash/accident. In other applications, the presence of persons hiding in a predetermined space is detected, including caves, underground bunkers, tunnels, etc. The rescue of military personnel or of persons trapped under rubble, behind barriers, within building, etc., is facilitated. In one embodiment, human beings are detected using data obtained from pressure transducers in the space of interest. The pressure signals are processed by a novel signal processing algorithm to determine the presence or absence of a human being, using information from different types of pressure transducers. In addition, the system can identify other characteristics of a human being, such as whether a vehicle seat occupant is normally seated or leaning, once it is determined that a human being occupies the seat.

Another example of a presence detection system is known from U.S. Pat. No. 6,255,946 B1, which discloses a system for detecting the presence and direction of an object passing through a gate, for example, a door of a building or a room, and announcing the detection result to the operator or persons in the building or the room. The system detects an object passing through a gate supported laterally by a frame. The system comprises a reflector, signal generating and determining means, and a user interface. The reflector is disposed at an edge of the frame. The signal generating and determining means is disposed at the other edge of the frame so as to face the reflector. The signal generating and determining means generates a first and a second infrared beams to emit to the reflector, receives a mixed beam in which the first and the second beams reflected by the reflector are superimposed, and determines the presence and direction of the object passing through the gate based on the mixed beam. The user interface notifies a user of the presence and direction of the object when the object passes through the gate and receives an operation command from the user. The signal generating and determining means comprises first and second infrared emitters for generating the first and the second infrared beams, respectively. The first and the second infrared emitters are mounted in a single housing.

These systems have the problem that they do not distinguish well between human and non-human objects. Distinguishing between human and non-human objects is an important requirement for smart spaces where specific decisions are taken dependent on the presence of human beings, for example where lamps are turned on automatically when a human being enters a room. In such a case, movement of a non-human object into a room should not trigger the lighting system to turn on the lamps automatically.

SUMMARY OF THE INVENTION

The invention is based on the idea to create a signature of a moving object which can be used to determine whether the object is a human being. An important advantage of such a signature is that the person's identity does not need to be revealed and there is inherent ambiguity in the proposed presence detection system that safeguards privacy. It should be noted that presence detection systems which are based on video surveillance are also able to distinguish human objects from non-human objects, but they have the disadvantage that they do not safeguard the anonymity of the observed persons.

BRIEF DESCRIPTION OF THE DRAWINGS

The invention will be more completely understood in light of the following detailed description of various embodiments of the invention in connection with the accompanying drawings, in which.

DETAILED DESCRIPTION

Figure 1:
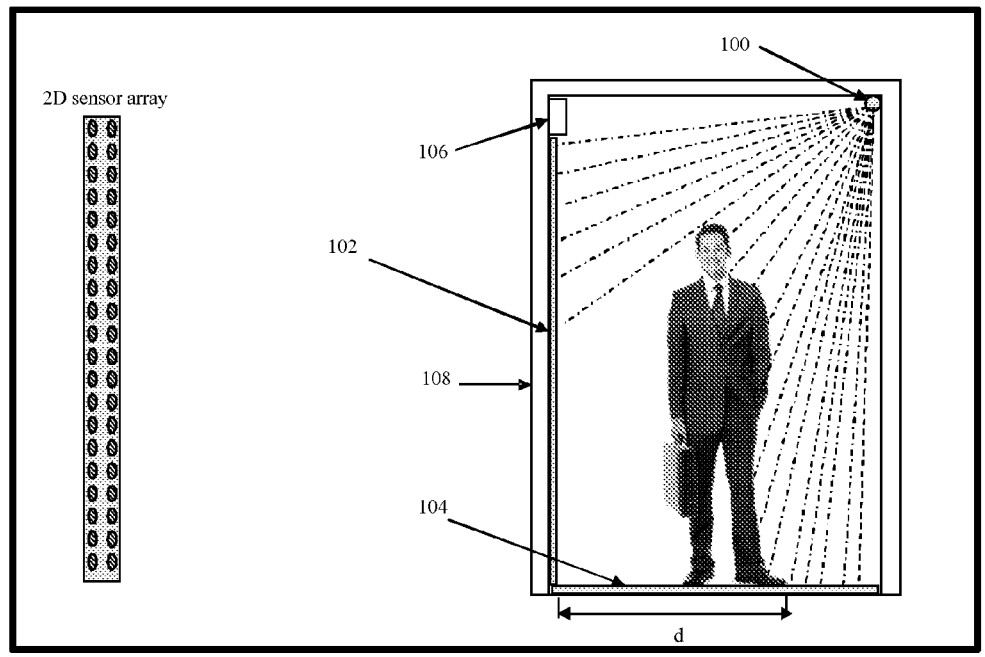
FIG. 1 illustrates an example of a presence detection system according to the invention.

FIG. 1 illustrates an example of a presence detection system according to the invention. The presence detection system identifies the presence of a person and also identifies a person with some ambiguity, which means that a set of personal characteristics can be determined although the person's exact identity remains unknown. This is advantageous in view of privacy requirements.

The presence detection system may also keep a count of the number of humans in a closed environment such as a home, office or store, provided that all persons that enter or leave the spaces within such environment are detected in the way conceived by the invention. Furthermore, if each distinct space within such an environment is equipped with the presence detection system, it is possible to generate statistical data which reflect the distribution of people within the environment.

The presence detection system comprises a light source 100 which emits invisible light, for example infrared light. A plurality of sensors 102 and 104 is arranged to receive the invisible light. An individual sensor receives the light if there is no object which blocks the light, or more precisely, if there is no object blocking the light on the linear travelling path between the light source and the individual sensor. If an object moves through the entrance 108 in which the system is mounted, only a specific subset of the sensors will receive the invisible light. In other words, if an object moves through the entrance 108, one group of sensors will receive the light and generate a signal indicative of such receipt, and another group of sensors will not receive the light and generate no signal. The specific subset is thus composed of those sensors which receive the invisible light. A sensor processing unit 106 is arranged to create an object signature based upon the composition of the subset of sensors that received the invisible light.

For this purpose the sensor processing unit should also be able to identify the sensors from which it receives the respective signals. The skilled person will appreciate that this can be implemented in various ways which are known per se. For example, a signal may comprise an identifier of the individual sensor from which it originates. Alternatively, a designated communication line may be implemented between each individual sensor and the sensor processing unit.

After the object signature has been created, it can be compared to a set of predefined signatures in a database, for example, in order to determine whether the signature is a typical human signature.

In an embodiment the plurality of sensors comprises a two-dimensional array of sensors 102 mounted substantially vertically in a frame of the entrance 108, for example a door-frame, on a side substantially opposite to the light source 100. The two-dimensional array comprises a first column of sensors and a second column of sensors. When an object moves through the entrance, the sensors of the first column and the sensors of the second columns will be triggered in a certain chronologic order. The sensors of the first column are triggered before the sensors of the second column, or vice versa. The sensor processing unit 106 uses the chronologic order in which the sensors of the distinct columns are triggered to determine the direction in which the object is moving, i.e. to determine whether the object is entering or leaving the space. Furthermore, it is possible to estimate the speed of the moving object based upon the time elapsed between the triggering of the sensors of the first column and the sensors of the second column, or vice versa, as the case may be.

The skilled person will appreciate that the two-dimensional array is not necessarily limited to two columns, but may be extended to three columns or more. It should also be noted that the number of rows in the two-dimensional array influences the accuracy of the measurements, i.e. a larger amount of rows generally provides a higher accuracy.

In a further embodiment the plurality of sensors comprises, in addition to the two-dimensional array, a one-dimensional array of sensors 104 mounted in the frame substantially perpendicular to the two-dimensional array of sensors 102. By means of this additional one-dimensional array of sensors the object signature can be determined with more precision. The height of the object is determined by first determining a distance value d, which is indicative of the distance between the object and the frame, based upon signals generated by the sensors 104 of the one-dimensional array, and then calculating the height of the object using the distance value d and signals generated by the sensors 102 of the two-dimensional array.

The knowledge of the height and the speed of the moving object can be used to determine its gait. Human beings are known to have individual gaits; this property can be used to identify people (see Human Identification Based on Gait (International Series on Biometrics), by Mark S. Nixon, Tieniu Tan and Rama Chellappa, Springer 1 edition (Nov. 29, 2005)). The gait allows for a more precise signature of the moving object. It can also be used to provide for an exact identification of a person if the system is properly configured for this purpose. In the latter case users of the system should accept to be identified, and a person's individual gait should be coupled to his or her identity in a database, for example, in order to provide for automatic identification.

Figure 2:
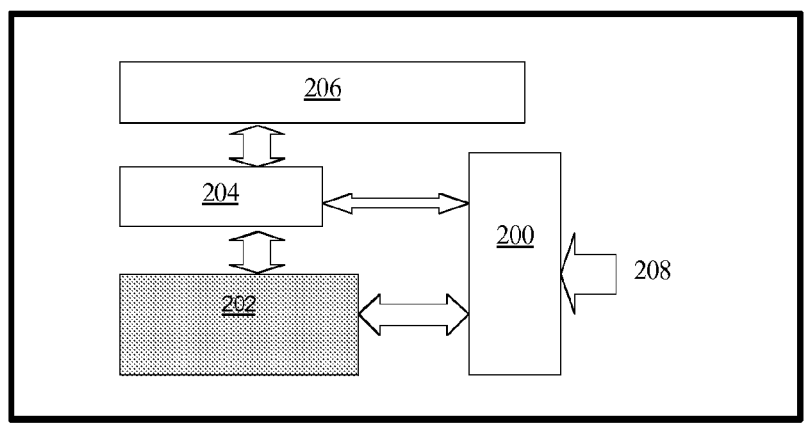
FIG. 2 illustrates an example of a sensor processing unit according to the invention.

FIG. 2 illustrates an example of a sensor processing unit according to the invention. The sensor processing unit includes a memory unit 200 for storing input data 208 provided by the plurality of sensors 102, 104, a hardware accelerator unit 202 for computing the signature of the object, a communication unit 206 for communicating with controllable devices in the space, and a central processing unit 204 for controlling the memory unit 200, the hardware accelerator unit 202 and the communication unit 206.

In operation, the input data 208 provided by the sensors originate from the signals generated by the sensors that received the invisible light. The input data 208 reflect the composition of the subset of sensors that received the invisible light. The data are stored in the memory unit 200. They can be retrieved from the memory unit 200 by the hardware accelerator unit 202 directly or under the control of the central processing unit 204. The hardware accelerator unit 202 computes the object signature by using the data retrieved from the memory unit 200. The communication unit 206 communicates with controllable devices in a smart space, such as lighting subsystems or individual lamps, which have to respond to a certain event, for example a person entering or leaving the space.

Figure 3:
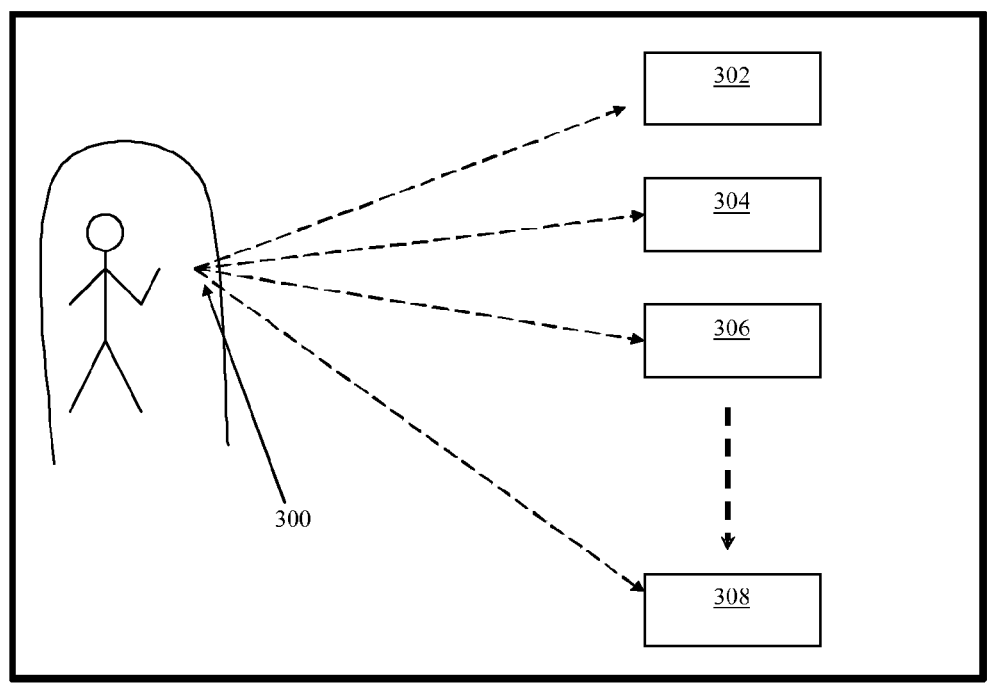
FIG. 3 illustrates the use of the presence detection system in a smart space.

FIG. 3 illustrates the use of the presence detection system according to the invention in a smart space. When a person moves through an entrance equipped with the presence detection system 300, the system 300 detects the person and sends commands to devices 302, 304, 306, 308 to respond in the appropriate manner. For example, device 302 may be a lighting controller which turns on the lights in the smart space. Device 304 may be an audio device which starts to play music in response to the person entering the room. If exact identification of persons is enabled in accordance with an embodiment of the invention, a specific artist may be preselected for each distinct person entering the room. Other devices 306, 308 may form part of a heating subsystem or a more comprehensive subsystem which includes ventilation and air-conditioning functionality.

In short, the invention can be used to advantage in a Heating Ventilation Air Conditioning (HVAC) system, a lighting system, a combination thereof or in any other type of smart space in a controlled environment such as a home, an office or a store. For example, the invention can also be used to advantage in an alarming system, i.e. the presence detection system can be linked to a device for alarming people in the space in case of a calamity. The invention can further be applied in an entertainment system, for example a music player can detect a signal from the presence detection system and start playing music that a detected person likes, provided that the person allows the system to identify him/her. The system could also play a commercial advertisement based on the identity/gender of the detected person.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A presence detection system for detecting objects which move through an entrance of a space, comprising:

a light source for emitting invisible light;

a plurality of sensors for receiving the invisible light emitted by the light source; and a sensor processing unit for creating a signature of a moving object;

the presence detection system being arranged such that, in use, a subset of the sensors receives the invisible light upon movement of the object through the entrance, and such that the sensor processing unit creates the signature based upon the composition of the subset, wherein the plurality of sensors comprises a two-dimensional array of sensors mounted substantially vertically in a frame of the entrance;

wherein the two-dimensional array of sensors comprises at least a first column of sensors and a second column of sensors;

and wherein the sensor processing unit is arranged to determine whether the object enters or leaves the space by monitoring the chronologic order in which the sensors of the first column and the sensors of the second column receive the invisible light, characterized in that the plurality of sensors further comprises a one-dimensional array of sensors mounted in the frame substantially perpendicular to the two-dimensional array of sensors;

wherein the sensor processing unit is arranged to determine the height of the object by:

determining a distance value indicative of the distance between the object and the frame based upon signals generated by the sensors of the one-dimensional array, and calculating the height of the object using the distance value and signals generated by the sensors of the two-dimensional array.

2. A presence detection system as claimed in claim 1, wherein the sensor processing unit comprises:

a memory unit for storing data provided by the plurality of sensors, a hardware accelerator unit for computing the signature of the object, a communication unit for communicating with controllable devices in the space, and a central processing unit for controlling the memory unit, the hardware accelerator unit and the communication unit.

3. A presence detection system as claimed in claim 1, wherein the invisible light comprises infrared light.

4. A Heating Ventilation Air Conditioning system comprising a presence detection system as claimed in claim 1.

5. A lighting system comprising a presence detection system as claimed in claim 1.

6. An alarming system comprising a presence detection system as claimed in claim 1.

7. An entertainment system comprising a presence detection system as claimed in claim 1.

8. A presence detection method for detecting objects which move through an entrance of a space, wherein:

a light source emits invisible light;

a plurality of sensors receives the invisible light emitted by the light source;

a subset of the sensors receives the invisible light upon movement of an object through the entrance;

a sensor processing unit creates a signature of the object based upon the composition of the subset, wherein the plurality of sensors comprise a two-dimensional array of sensors mounted substantially vertically in a frame of the entrance;

wherein the two dimensional array of sensor comprises at least a first column of sensors and a second column of sensor;

and wherein the sensor processing unit determines whether the object enters or leaves the space by monitoring the chronologic order in which the sensors of the first column and the sensors of the second column receive the invisible light, characterized in that the plurality of sensors further comprises a one-dimensional array of sensors mounted in the frame substantially perpendicular to the two dimensional array of sensors;

wherein the sensor processing unit determines the height of the object by:

determining a distance value indicative of the distance between the object and the frame based upon signals generated by the sensors of the one dimensional array, and calculating the height of the object using the distance value and signals generated by the sensors of the two dimensional array.

\* \* \* \* \*